(No Model.) 2 Sheets—Sheet 1.

C. SEYMOUR.
MOLDING MACHINE.

No. 509,331. Patented Nov. 21, 1893.

Witnesses
G. F. Downing.
Harry B. Armel.

Inventor
Charles Seymour
By Leggett & Leggett
Attorneys (No Model.) 2 Sheets—Sheet 2.

C. SEYMOUR.
MOLDING MACHINE.

No. 509,331. Patented Nov. 21, 1893.

Witnesses
G. F. Downing.
Harry B. Ames.

Inventor
Charles Seymour
By Leggett & Leggett
Attorneys

UNITED STATES PATENT OFFICE.

CHARLES SEYMOUR, OF DEFIANCE, OHIO, ASSIGNOR TO THE DEFIANCE MACHINE WORKS, OF SAME PLACE.

MOLDING-MACHINE.

SPECIFICATION forming part of Letters Patent No. 509,331, dated November 21, 1893.

Application filed July 29, 1892. Serial No. 441,634. (No model.)

*To all whom it may concern:*

Be it known that I, CHARLES SEYMOUR, a resident of Defiance, in the county of Defiance and State of Ohio, have invented certain new and useful Improvements in Molding-Machines; and I do hereby declare the following to be a full, clear, and exact description of the invention, such as will enable others skilled in the art to which it appertains to make and use the same.

My invention relates to machines for making molding, and more particularly to such as are employed for molding the faces of blocks of wood used for ornamentation in cabinet and carpenter's work, plinth blocks, brackets, balusters, newel posts, &c., the object of the invention being to produce a simple and efficient means for supporting and carrying the material to be operated upon.

A further object is to provide a simple, light and efficient framework or support for the operating parts of the machine.

A further object is to produce a molding machine which shall be neat in appearance and effectual in the performance of its functions.

With these objects in view the invention consists in certain novel features of construction and combinations and arrangements of parts, as hereinafter set forth and pointed out in the claim.

Figure 1:
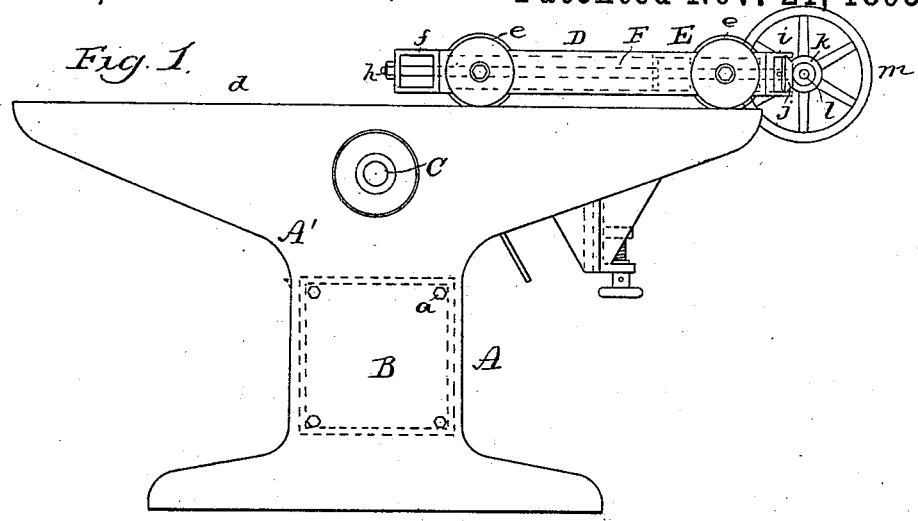
Figure 2:
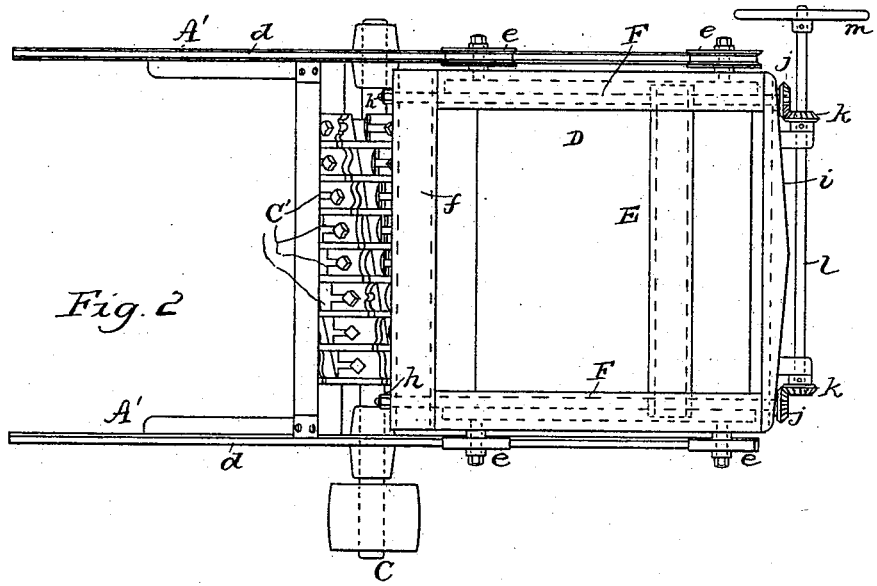
Figure 3:
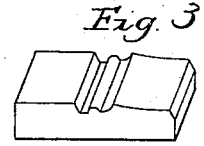
Figure 4:
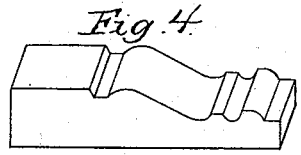
Figure 5:
Figure 6:
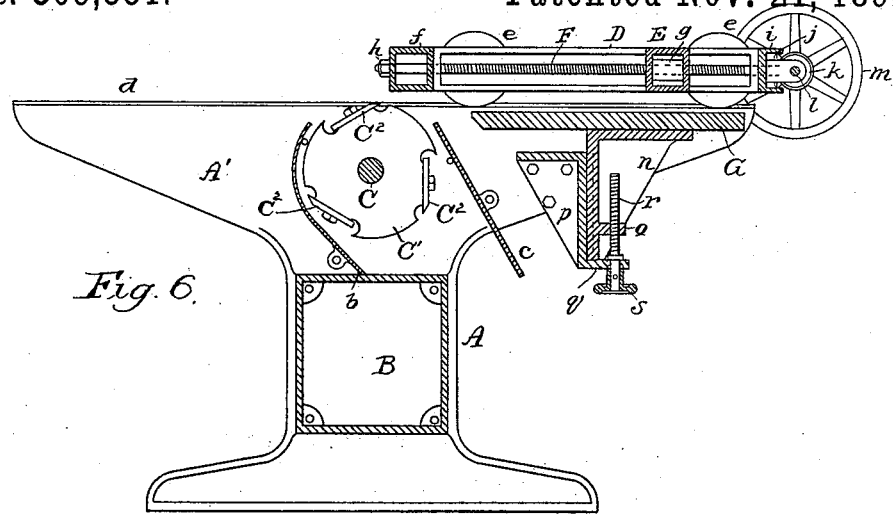
Figure 7:
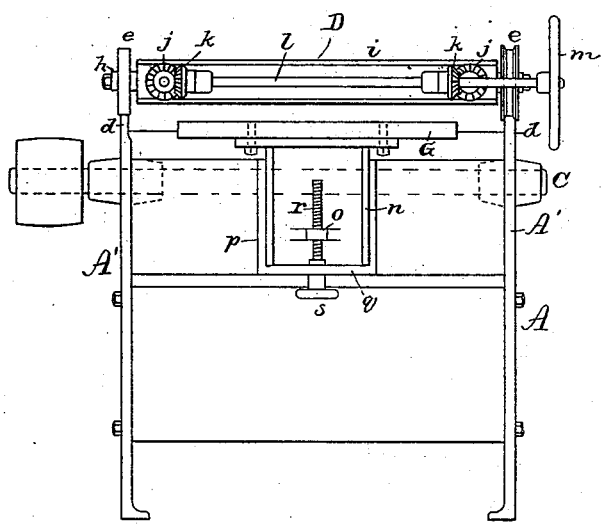

In the accompanying drawings: Figure 1 is a side view of my improvements. Fig. 2 is a plan view. Figs. 3, 4 and 5 illustrate the style of molding capable of production by means of my improved machine. Fig. 6 is a sectional view of the machine. Fig. 7 is an end view.

A represents the frame for supporting the operating parts of the machine, and comprises two upright plates or standards A' of substantially T-shape, which are connected together at their narrowest portions by means of a hollow rectangular trunk, B,—said trunk and uprights or standards being secured together by means of suitable bolts $a$.

Mounted in suitable boxes in the side plates or uprights A' is a shaft C, which carries a series of cutter heads C', each carrying a series of cutters $C^2$ of a preferred form, all the cutters acting together to produce a molding of the desired design.

Guards or fenders $b$, $c$ are preferably located between the plates or standards A' and in proximity to the cutter heads. The upper edges of the uprights or standards are flanged to produce tracks $d$ on which the wheels $e$ of a carriage D are adapted to run. The forward cross bar $f$ of the carriage D is preferably made hollow to secure lightness and rigidity and the side bars of the carriage are cast with their inner faces open or recessed for the reception of the ends of a movable cross bar E, which is also preferably made hollow.

In proximity to each end of the movable cross bar E, a nut $g$ is located therein, through which nuts screws F pass, the screw at one side of the machine being made right-handed and the screw at the other side being made left handed. The forward ends of the screws F are made plain and pass through the hollow end bar $f$ and at their outer extremities beyond said cross bar $f$ are screw-threaded for the reception of nuts $h$. The inner ends of the screws are made plain and pass loosely through the cross bar $i$ at the inner end of the carriage, and are provided with bevel pinions $j,j$, which mesh with bevel pinions $k$, $k$ carried by a transverse shaft $l$ at the inner end of the machine. The shaft $l$ is provided with a hand wheel $m$, by operating which the shaft $l$ will be rotated, and, through the medium of the gearing above explained, the screws F will be rotated and the movable cross bar E moved forward or backward to clamp the material to be acted upon between it and the cross bar $f$ or release it therefrom.

Located between the plates or uprights A', at the rear end of the machine, is a table G, to which a depending bracket $n$ is secured and provided with a flange or projection $o$. A bracket $p$ is secured to the frame of the machine and at its lower end is provided with an arm or flange $q$. The arm or flange $q$ and the flange or projection $o$ are provided with screw-threaded perforations for the accommodation of a screw $r$, the portion of the screw passing through the arm or flange $q$ being made plain. The screw is provided with a head or knob s by means of which to operate it. By turning the screw r the table will be moved up or down as desired.

Instead of providing the carriage with wheels, slides may be employed to run on the tracks d at the upper edges of the side plates or standards of the machine.

In operating the machine, the carriage will be drawn to a position directly above the table G. The material to be molded will then be placed on the table, with the face to be molded downward, and between the cross bars f and E. The hand wheel m will then be turned until the material is securely gripped by the bars f, E. The carriage will then be impelled in any suitable manner, and its contents be molded over the revolving cutters.

From the above it will be seen that the carriage D also acts as a chuck or vise.

Slight changes might be made in the details of construction of my invention without departing from the spirit thereof or limiting its scope. Hence I do not wish to limit myself to the precise details of construction herein set forth; but, Having fully described my invention, what I claim as new, and desire to secure by Letters Patent, is—

The combination with a frame comprising a pair of side plates the upper ends of which are elongated and provided with tracks, and centrally located connecting trunk, of cutter head journaled in the side plate over the trunk, fenders located on each side of the cutter head, the lower edge of one fender terminating at the top of the trunk and the lower edge of the other a short distance from the trunk whereby an opening is formed for the discharge of the chips, and a carriage constructed and adapted to travel on the tracks and provided with clamping means for holding the material to be operated upon, substantially as set forth.

In testimony whereof I have signed this specification in the presence of two subscribing witnesses.

CHARLES SEYMOUR.

Witnesses:
GEO. W. DEATRICK,
MAY E. FISHER.